US008889766B2

(12) United States Patent
Kysar et al.

(10) Patent No.: US 8,889,766 B2
(45) Date of Patent: Nov. 18, 2014

(54) THIN GLASSY POLYMER FILMS INCLUDING SPHERICAL NANOPARTICLES

(75) Inventors: Jeffrey William Kysar, New York, NY (US); Sanat K. Kumar, New York, NY (US); Benjamin Fragneaud, New York, NY (US); Damien Maillard, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 61 days.

(21) Appl. No.: 13/410,005

(22) Filed: Mar. 1, 2012

(65) Prior Publication Data

US 2012/0277377 A1  Nov. 1, 2012

Related U.S. Application Data

(60) Provisional application No. 61/448,058, filed on Mar. 1, 2011.

(51) Int. Cl.
*C08K 9/00* (2006.01)
*C08F 292/00* (2006.01)
*B82Y 30/00* (2011.01)
*C08L 51/10* (2006.01)
*C08L 25/06* (2006.01)

(52) U.S. Cl.
CPC .............. B82Y 30/00 (2013.01); C08F 292/00 (2013.01); *C08L 25/06* (2013.01); C08L 51/10 (2013.01); *Y10S 977/773* (2013.01)
USPC ........... 523/216; 523/200; 523/209; 523/223; 525/64; 977/773

(58) Field of Classification Search
CPC ......... C08L 25/02; C08L 25/04; C08L 25/06; C08K 3/36
USPC .................. 523/200, 209, 216, 223; 525/64; 977/773
See application file for complete search history.

(56) References Cited

U.S. PATENT DOCUMENTS

| | | | |
|---|---|---|---|
| 6,503,295 | B1 | 1/2003 | Koros et al. |
| 6,627,314 | B2 | 9/2003 | Matyjaszewski |
| 6,737,364 | B2 | 5/2004 | Black et al. |
| 6,808,557 | B2 | 10/2004 | Holbrey et al. |
| 7,837,909 | B2 | 11/2010 | Chmelka et al. |
| 7,846,496 | B2 | 12/2010 | Liu et al. |
| 2002/0106513 | A1 | 8/2002 | Matyjaszewski et al. |
| 2005/0084607 | A1 | 4/2005 | Wang |
| 2006/0286378 | A1 | 12/2006 | Chiruvolu et al. |
| 2007/0020749 | A1 | 1/2007 | Nealey et al. |
| 2007/0026069 | A1 | 2/2007 | Shastri et al. |
| 2009/0011160 | A1 | 1/2009 | Paulussen et al. |
| 2010/0303874 | A1 | 12/2010 | Akcora et al. |

FOREIGN PATENT DOCUMENTS

| | | |
|---|---|---|
| WO | WO-0224310 A1 | 3/2002 |
| WO | WO-2009027376 A1 | 3/2009 |
| WO | WO-2009078985 A1 | 6/2009 |

OTHER PUBLICATIONS

"U.S. Appl. No. 12/746,865, Response filed Jan. 29, 2013 to Restriction Requirement mailed Sep. 14, 2012", 9 pgs.
"U.S. Appl. No. 12/746,865, Restriction Requirement mailed Sep. 14, 2012", 7 pgs.
"International Application Serial No. PCT/US2008/013769, International Search Report mailed Mar. 19, 2009", p. 220.
"International Application Serial No. PCT/US2008/013769, Written Opinion mailed Mar. 19, 2009", p. 237.
Alexandre, M., et al., "Polymer-Layered Silicate Nanocornposites: Preparation, Properties and Uses of a New Class of Materials", Materials Science & Engineering R-Reports, 28(1-2), (2000), 1-63.
Kashiwagi, T, et al., "Nanoparticle Networks Reduce the Flammability of Polymer Nanocomposites", Nature Materials, 4(12), (2005), 928-933.
Lin, Y., et al., "Self-Directed Self-Assembly of Nanoparticle/Copolymer Mixtures", Nature, 434(7029), (2005), 55-59.
McConnell, H. M., et al., "Brownian Motion of Lipid Domains in Electrostatic Traps in Monolayers", J. Phys. Chem., 94, (1990), 8965-8968.
Moniruzzaman, M., et al., "Polymer Nanocomposites Containing Carbon Nanotubes", Macromolecules, 39(16), (2006), 5194-5205.
Ray, S. S., et al., "Polymer/Layered Silicate Nanocomposites: A Review From Preparatiion to Processing", Progress in Polymer Science, 28(11), (2003), 1539-1641.
Schmidt, P. G. "Polyethylene Terephthalate Structural Studies". Journal of Polymer Science Part A: General Papers, 1(4), (Apr. 1963), 1271-1292.
Tang, Z., et al., "Self-Assembly of CdTe Nanocrystals Into Free Floating Sheets", Science, 314, (2006), 274-278.
Thostenson, E. T., et al., "Advances in the Science and Technology of Carbon Nanotubes and Their Composites: A Review", Composites Science and Technology, 61(13), (2001), 1899-1912.
Yan, L. F., et al., "Dipolar Chains and 2D Aligned Stripes of Polymer-Coated Magnetic Iron Colloid", Journal of Applied Polymer Science, 101(6), (2006), 4211-4215.
U.S. Appl. No. 12/746,865, Non Final Office Action mailed Mar. 12, 2014, 9 pgs.
U.S. Appl. No. 12/746,865, Non Final Office Action mailed Apr. 20, 2014, 10 pgs.

*Primary Examiner* — Hannah Pak
(74) *Attorney, Agent, or Firm* — Schwegman Lundberg & Woessner, P.A.

(57) ABSTRACT

A method of forming a solid-state polymer can include grafting a graft polymer to nanoparticles to provide grafted nanoparticles, and dispersing the grafted nanoparticles in a polymer matrix to provide a specified loading of the grafted nanoparticles within the polymer matrix to form a solid-state polymer. A solid-state polymer can include grafted nanoparticles comprising a polymer graft grafted to nanoparticles, and a polymer matrix, in which the grafted nanoparticles are dispersed to form a solid-state polymer, the dispersion configured to provide a specified loading of the grafted nanoparticles within the solid-state polymer.

21 Claims, 9 Drawing Sheets

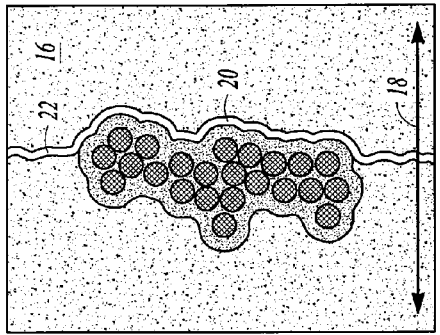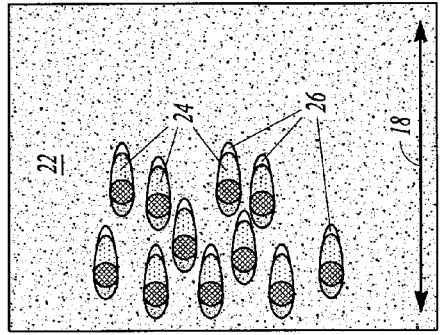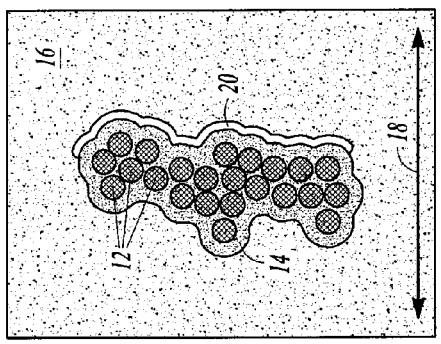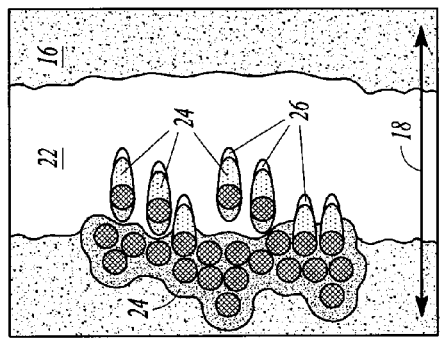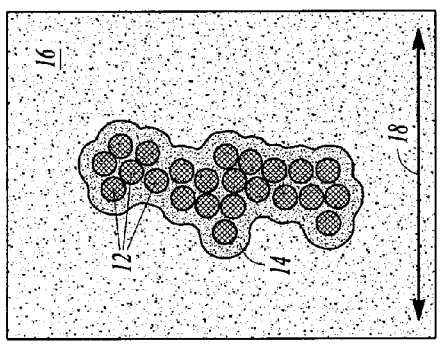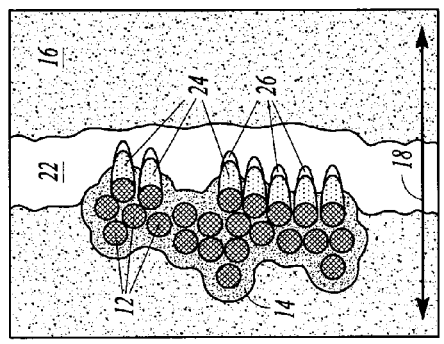

THIN GLASSY POLYMER FILMS INCLUDING SPHERICAL NANOPARTICLES

CLAIM OF PRIORITY

This application also claims priority under 35 U.S.C. 119(e) to U.S. Provisional Patent Application Ser. No. 61/448,058, filed Mar. 1, 2011, which application is hereby incorporated by reference herein in its entirety.

STATEMENT REGARDING FEDERALLY SPONSORED RESEARCH OR DEVELOPMENT

This invention was made with government support under award number DMR0864647 from NSF; and award number CMMI-0826093 from NSF. The government has certain rights in this invention.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2012, The Trustees of Columbia University in the City of New York. All Rights Reserved.

SUMMARY

Adding spherical nanofiller to amorphous solid-state polymers is expected to improve their modulus, but generally only at the expense of their toughness and yield stress. In contrast to these expectations, the present inventors have recognized, among other things, that these three metrics of a polymer's mechanical behavior can be simultaneously increased with a uniform dispersion of nanoparticles at concentrations just below percolation.

The present inventors have also recognized that to vary the spatial distribution of spherical silica nanoparticles, the nanoparticles can be grafted with polystyrene chains before placing them in a polystyrene matrix; the dislike between the polymer grafts and the nanoparticles then causes them to behave like block copolymers and spatially order into different structures depending on the grafting density, and grafted and matrix chain lengths. The present inventors have also recognized that the Young's modulus can generally depend on the amount of interfacially bound polymer, but that the yield stress and the strain-to-break can generally follow the wetting behavior of the polymer-particle interface. These different requirements can be simultaneously met when the particles are well dispersed in a wetting polymer matrix, a result that is qualitatively different from mechanical reinforcement in a liquid polymer where nanoparticle percolation is a central requirement.

In an example, a method of forming a solid-state polymer can include grafting a graft polymer to nanoparticles to provide grafted nanoparticles, and dispersing the grafted nanoparticles in a polymer matrix to provide a specified loading of the grafted nanoparticles within the polymer matrix to form a solid-state polymer.

In an example, a solid-state polymer can include grafted nanoparticles comprising a polymer graft grafted to nanoparticles, and a polymer matrix, in which the grafted nanoparticles are dispersed to form a solid-state polymer, the dispersion configured to provide a specified loading of the grafted nanoparticles within the solid-state polymer.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In FIGS. 4A and 4C the particles have brushes with 0.01 chains/nm$^2$ and 53 kg/mol; In FIG. 4B the particles have 0.01 chains/nm$^2$, 128 kg/mol. In FIG. 4D, the particles have 0.05 chains/nm$^2$, 114 kg/mol. Elongation stopped just after the yield stress (FIGS. 4A and 4B) or just before the final failure (FIGS. 4C and 4D).

FIGS. 6A through 6F show an illustrative example of a diagram of a scheme of the birth and growth of a deformation craze and band in a polymer matrix of a thin film containing fractal structures of polymer grafted nanoparticles, such as including graft polymer chains that can be substantially immiscible with the polymer matrix during a bulge test experiment (e.g., a tensile test).

Figure 1:
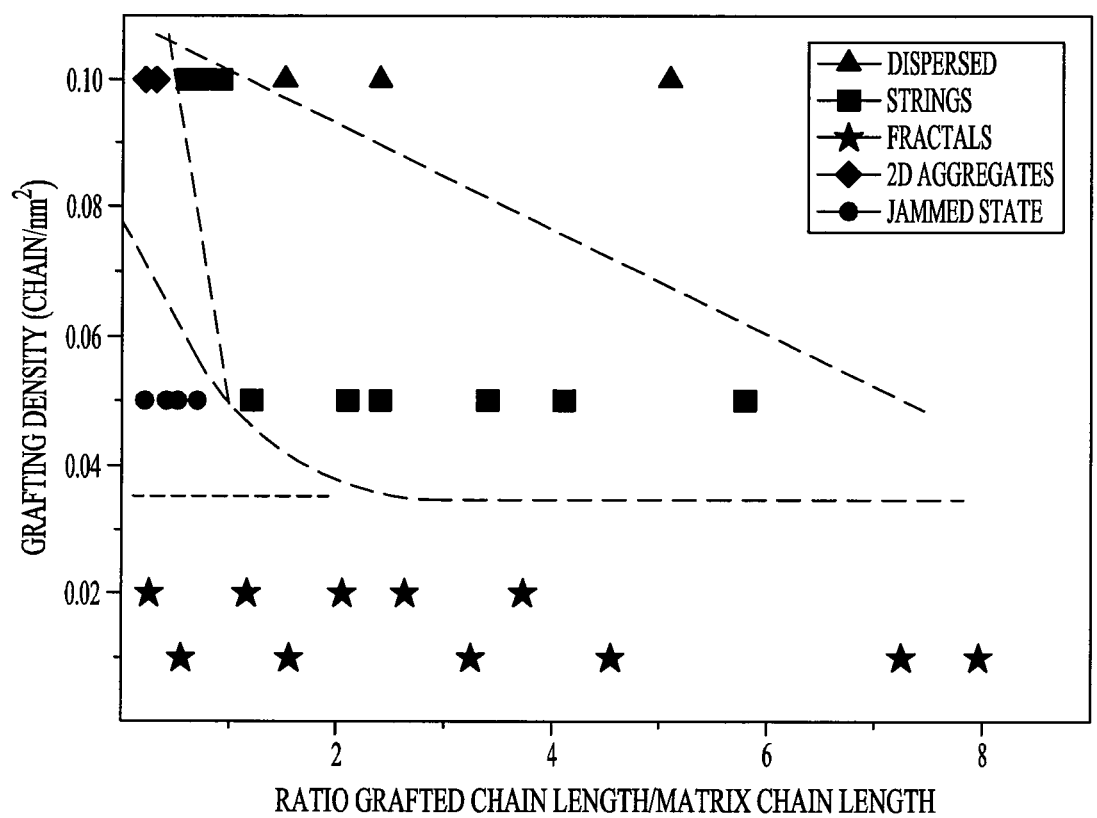
FIG. 1 shows an illustrative example of a structure diagram based on grafting density and grafted/matrix chain length ratio for PS grafted silica nanoparticles (14 nm of diameter) dispersed in PS matrix and annealed at 150° C. (for the number average molar mass ($M_n$) used in this study, 12 hours is sufficient to complete the structure formation). The films are 100 nm thick and the structures are formed at the top surface.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

There has been considerable interest in using nanofillers to enhance various polymer properties, e.g., conductivity, selective permeability and optical or mechanical response. The present disclosure concerns the mechanical properties of amorphous polymers in their solid state, e.g., below the glass transition temperature of the polymer, and how they are affected by the addition of nanoparticles. In the canonical case of a spherical filler, a Young's modulus can be increased by the addition of nanoparticles. In some approaches, however, the yield stress and the strain to break can be deleteriously affected in response to the addition of nanoparticles. Spherical silica nanoparticles (NPs), isotropically grafted with polystyrene layers, self-assemble into a range of superstructures when they are dispersed into homo-polystyrene matrices. The parameters governing this organization can include the molecular masses of the grafted and matrix polymers and the chain grafting density on the functionalized particles. The assembly process is driven by the "microphase separation" between the inorganic particle core and the organic grafted chains—a process analogous to the self-assembly of block copolymers (and other amphiphiles). The solid-state mechanical properties of thin films of nanocomposites can be determined using a bulge test, initially developed for metal thin films and adapted successfully to polymer thin films. In some examples, thin films (approximately 100 nm in thickness) are used because the bulge test cannot be readily applied to thick glassy polymer layers. The bulge test comprises applying an air pressure on a free standing film, measuring continuously the shape as the film bulges out. The results can be directly compared to a tensile test. As the profile of the film is recorded with a highly sensitive laser, samples as thin as 30 nm can be studied with accuracy.

Atomic force microscopy (AFM) can be used to characterize the structure formed by the particles at the surface of the films. FIG. 1 illustrates the experimentally determined "morphology diagram" of 100 nm thick films of these nanocomposites. In addition to the extremes of good NP dispersion and extremely poor NP dispersion ("spheres"), a range of other structures can be used, including short strings, sheets, and interconnected objects that can be obtained by tuning the matrix and brush chain molecular masses and the grafting density on the particles. These structures are 2-dimensional analogs of the structures seen previously in thick polymer films.

Figure 2A:
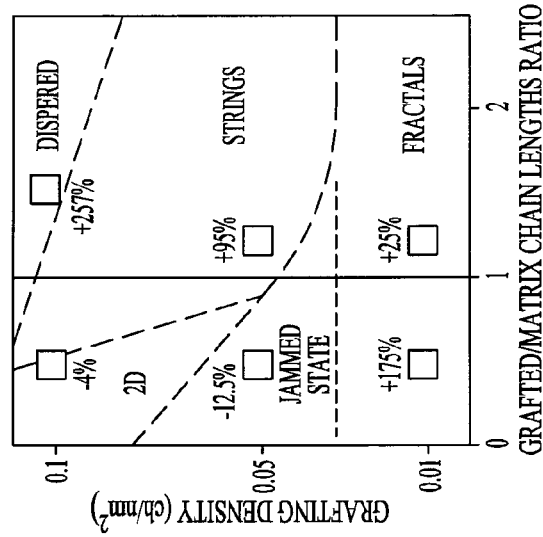
FIGS. 2A through 2C show an illustrative example of the reinforcement percentage of the Elastic Modulus, the Yield Stress, and the Failure Strain, respectively, depending on grafting density and grafted/matrix chain lengths ratio (Silica loading 5 wt %).
Figure 2B:
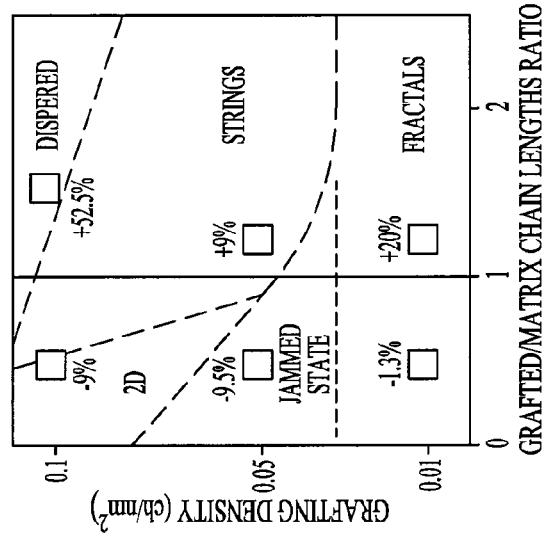
Figure 2C:
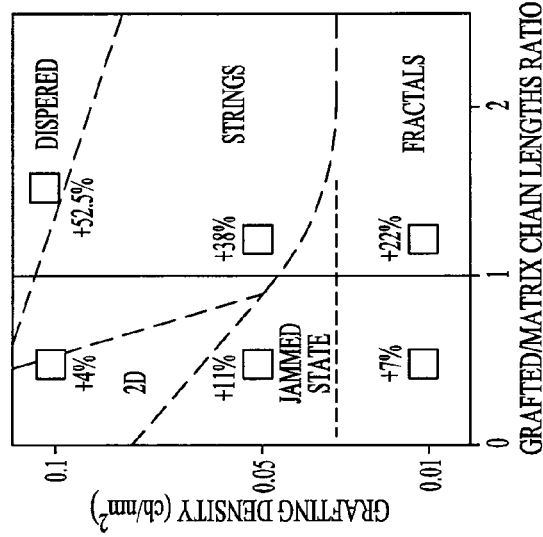

The elastic modulus of the pure polymer can be film thickness dependent, but can become thickness independent beyond approximately 100 nm, where the bulk value is attained (approximately 3 GPa). FIGS. 2A through 2C show that films comprised of well-dispersed nanoparticles can have the largest elastic modulus, strain-at-break and yield stress relative to the pure polymer. These results show that all aspects of the mechanical behavior of solid-state nanocomposites can be simultaneously increased, such as for a spatially uniform nanoparticle dispersion. Previously, it was generally believed that the Young's modulus could be improved by the addition of particles, but that the yield stress and strain-to-failure generally could not be improved for the same polymer. In contrast, the solid-state polymer of the present disclosure can increase all three properties for specific particle dispersion states. In an example, the dispersion state that provides for an optimized increase in the solid-state properties is a uniform particle dispersion. This is different from what is found in the case of polymer melts, where it has generally been believed that percolation of nanoparticles, probably mediated by the polymer, is necessary for mechanical reinforcement.

Figure 3A:
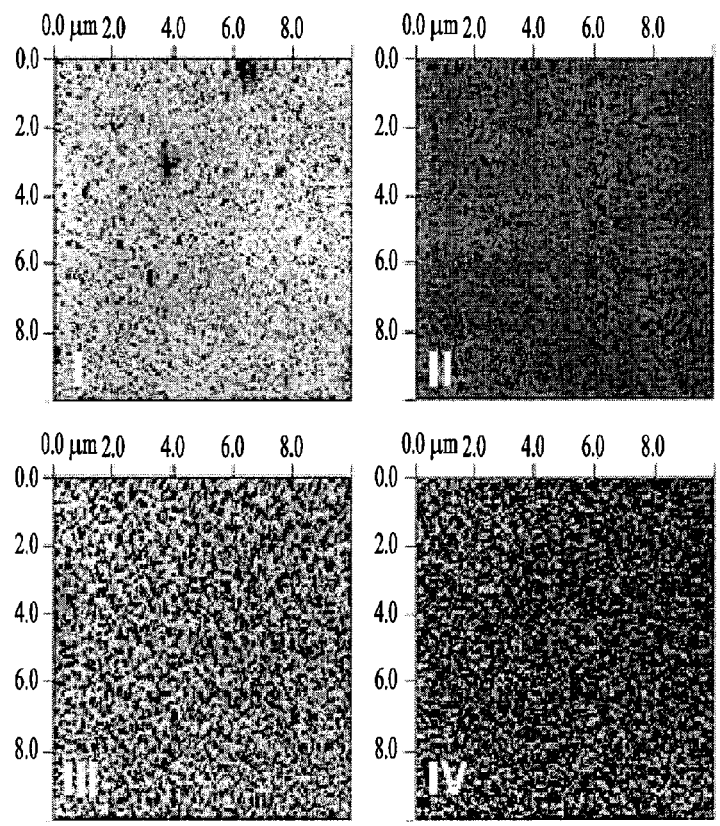
FIGS. 3A through 3F show an illustrative example of an elastic modulus, a yield stress, and a strain failure in 100 nm thick PS films containing PS grafted silica nanoparticles (14 nm of diameter, 0.05 chains/nm$^2$, 102 000 g/mol) depending of the silica loading, measured by bulge test.
Figure 3B:
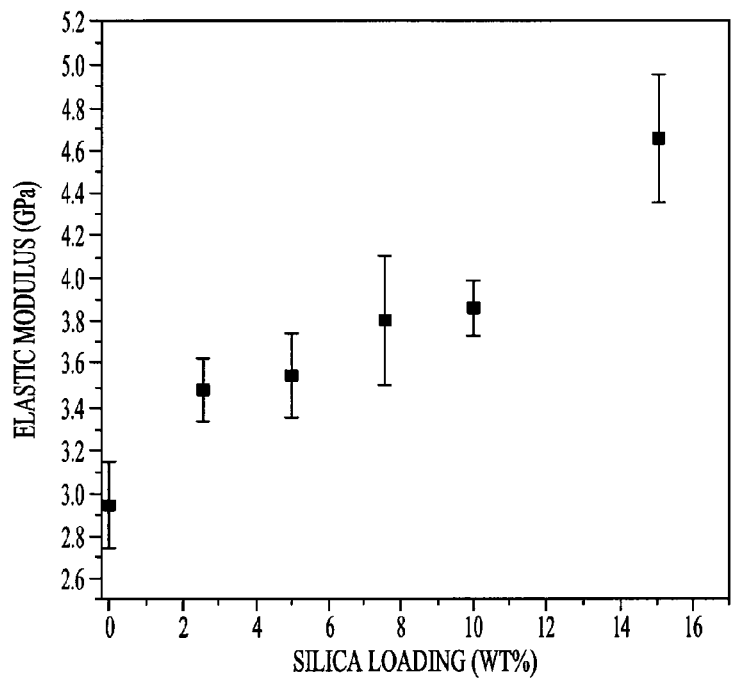
Figure 3C:
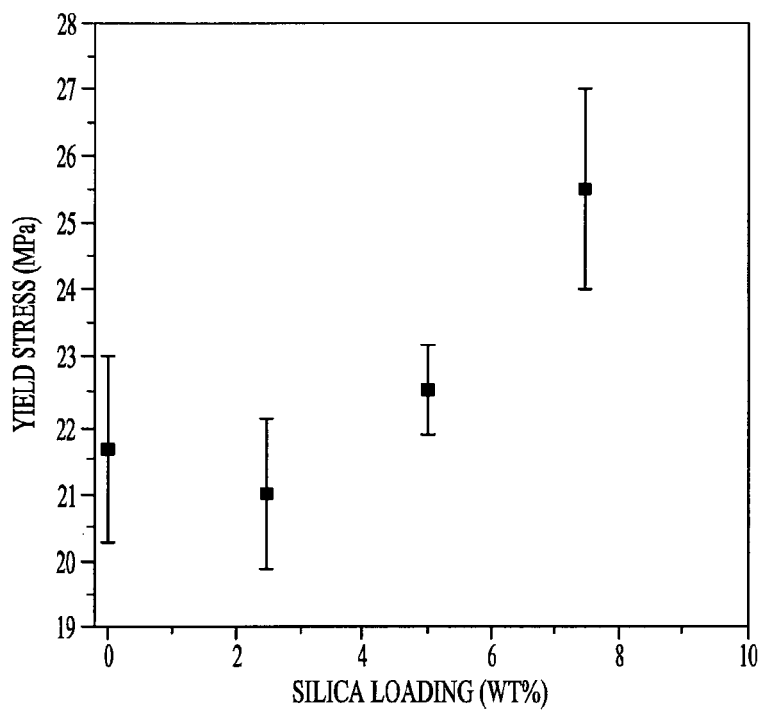
Figure 3D:
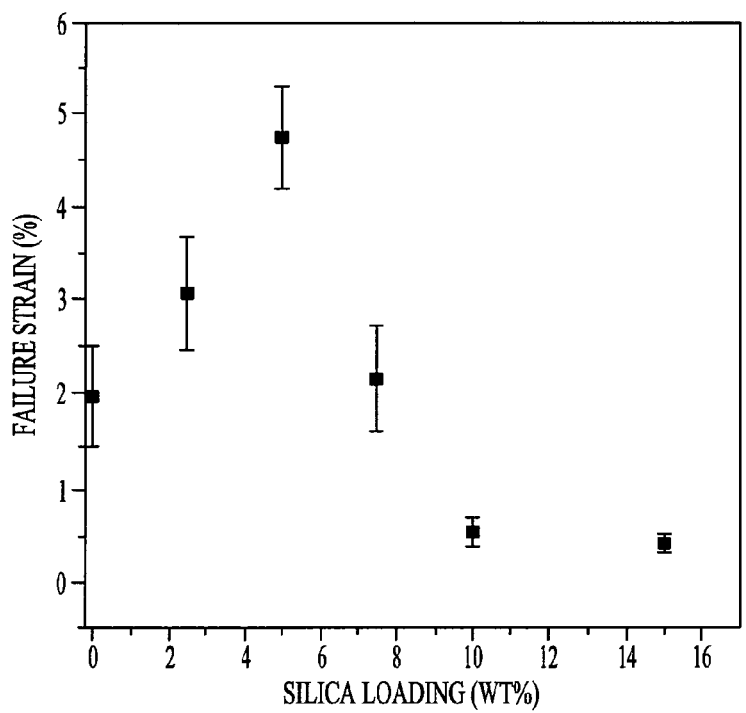
Figure 3E:
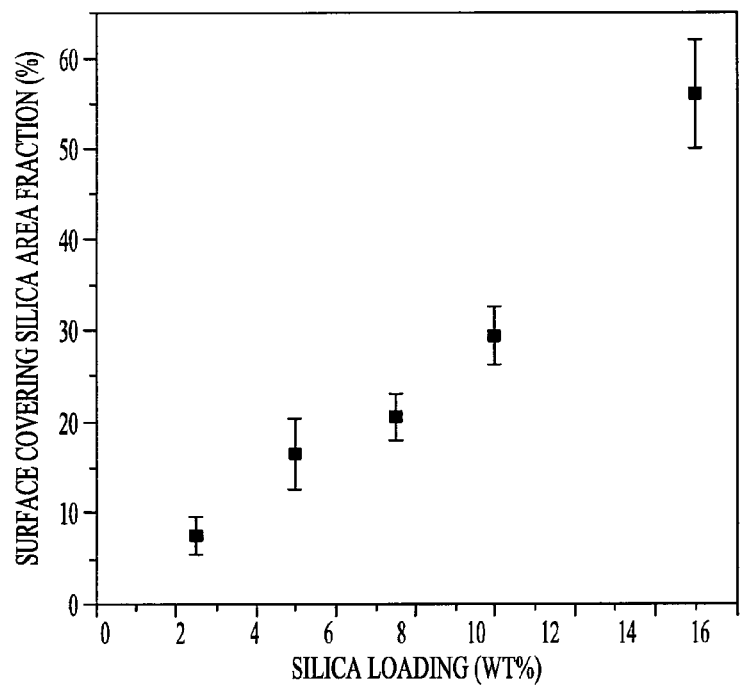
Figure 3F:
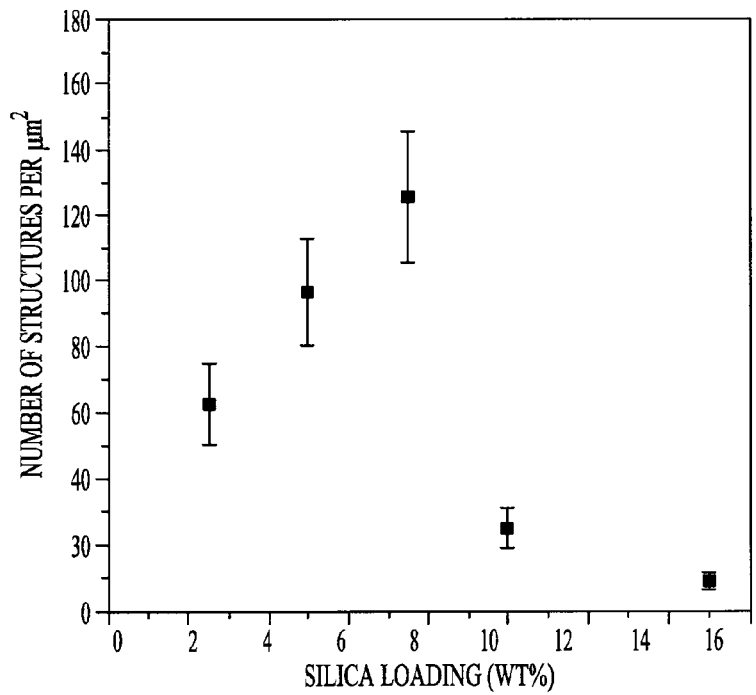

FIGS. 3B through 3D shows the evolution of the elastic modulus, yield stress and failure strain as a function of the silica nanoparticle loading for the representative case where they form strings. Both the Young's modulus and yield stress increase slowly with the particle loading (FIGS. 3B and 3C). The increase in Young's modulus can directly correlate with the surface area fraction that is occupied by the particles. In contrast, the failure strain increases linearly up to a particle core loading of 5 weight %, but drops significantly after this value. The loading evolution of the failure strain (FIG. 3D) tracks the number of separate structures that can be imaged by TEM (FIG. 1). The decrease seen starting at about 7 wt % particle loading is correlated with the percolation of the nanoparticle superstructures.

Young's Modulus:

Finite element modeling suggests that changes in the Young's modulus are proportional to the fraction of material "immobilized" on the particle surfaces.

Figures 4A, 4B:
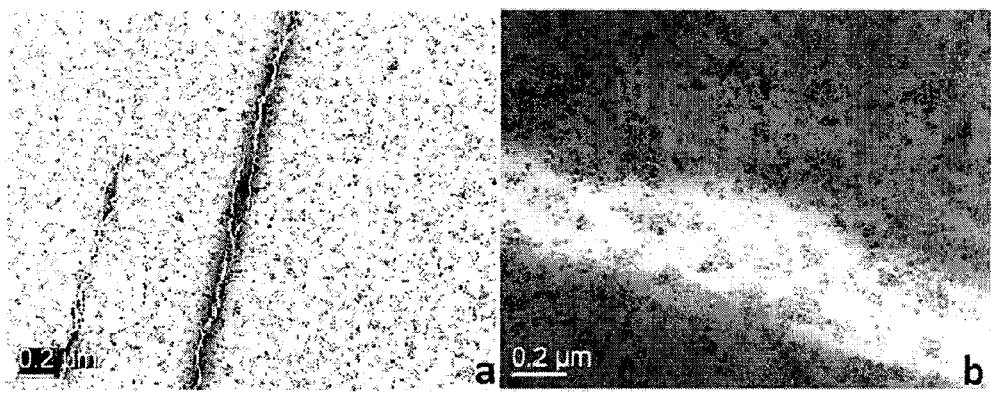
FIGS. 4A through 4D show illustrative examples of TEM micrographs of an elongated samples where the matrix molecular weight is 102 kg/mol in all cases.
Figures 4C, 4D:
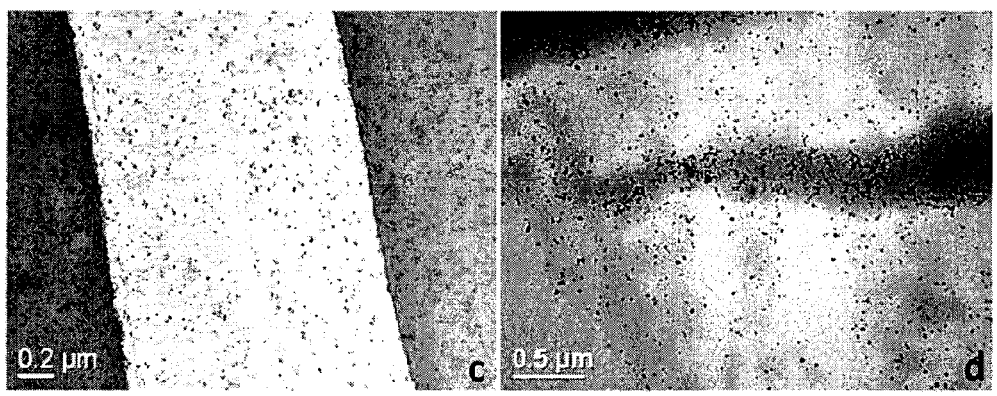

Yield Stress:

FIGS. 4A through 4D show TEM micrographs of the regions of plastic deformation in the bubble inflated samples. FIG. 4A corresponds to the case where the brush is shorter than the matrix polymer (e.g., a non-wetting interface), while FIG. 4B corresponds to a wetting interface (e.g., the grafted chains are longer than the matrix). This miscibility difference considerably modifies the initiation and evolution of the deformation bands. In the case of non miscible grafted chains (FIG. 4A), the polymer-particle interface can be the "weak" point in the structure. Thus, crazes appear parallel to the particle structures, perpendicular to the tensile direction, and the yield stress drops on the addition of nanoparticles. This effect can also occur in alumina/PMMA composites, or in $CaCO_3$/polypropylene composites. In contrast, no such weak point exists in the case of a wetting interface, shear bands can form and the yield stress can increase. So, the changes in yield stress with particle loading appear to be directly correlated to the wetting properties of the polymer-particle interface.

Figure 5A:
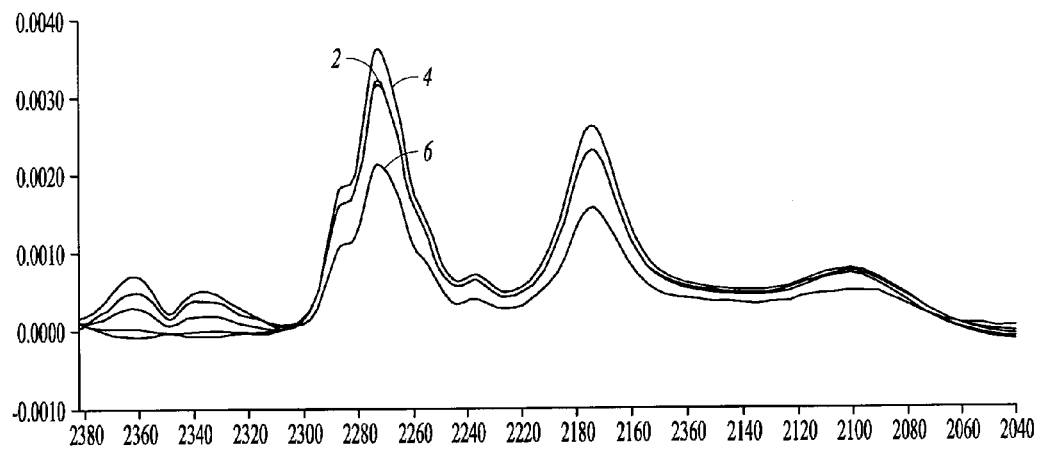
FIG. 5A is an illustrative example including a close up on the deuterated polystyrene (dPS) infrared signature of a pure dPS 100 nm thick film prepared by spin coating and annealed one hour at 150° C. The dPS infrared signatures can be collected as vertical and horizontal polarized spectrograms acquired with a beam perpendicular to the sample and as a horizontal polarized spectrogram acquired with a tilt of 30° along the horizontal axis.

Strain-to-Failure:

In the case of the non-wetting sample, failure (as with yield) can occur due to the formation of crazes. Associated with craze formation is the fact that the nanoparticles "move" under the action of applied stress. FIG. 5A clearly shows that the nanoparticles can be concentrated at the edges of the crazes that form in these samples. The NP mobility under stress can increases the strain-to-failure because of the associated energy dissipation in this particular case the strain-to-failure can be roughly 100% larger than for an unfilled polymer. As graft density increases, while keeping the interface weak, there is a sharp drop in the strain-to-failure. At the highest graft densities the particles form aggregates. The aggregates can nucleate cracks in the samples and hence can counter the toughening that accompanies the formation of crazes.

When the polymer-particle interface has a wetting character, the strain-to-failure can increase monotonically with graft density, with a maximum occurring for well dispersed particles. The mode of failure in these situations is not through crazing but rather through the formation of shear bands. Since the particle-polymer interface is "strong," failure occurs mainly in the polymer phase (cohesive failure).

The difference in behavior for miscible and non miscible chains is not only observable at the birth of the deformation bands, but also during their expansion. An example of a craze resulting from the well defined birth in the case of non miscible grafted chains is presented on FIG. 6C. Those crazes, also very well defined, are similar to crazes that are observable in thin films. Fibrils that can form as part of the crazes can be relatively large, compared to the generally-recognized crazes in thick films, and can be almost not identifiable as thin membranes. Depletion holes can be just visible in the mid-rib. The crazes can grow by consuming the polymer outside, aligning the chains inside of them. In the mean time, the craze band also consumes the particles around, destroying the structures and isolating the particles from each other. Those included particles generally come with a depletion "tail," oriented in the direction of the center of the band.

Figure 7A:
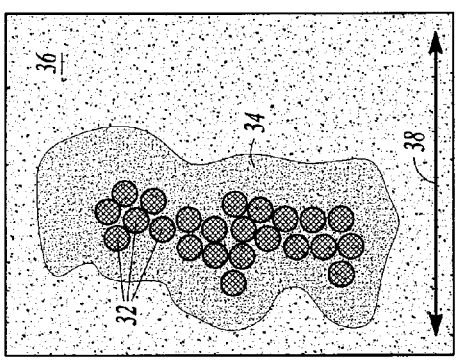
FIGS. 7A through 7F show a diagram of a scheme of the birth and growth of a deformation band in a polymer thin film containing fractal structures of polymer grafted nanoparticles with graft polymer chains that are substantially miscible with the polymer matrix during a bulge test experiment (tensile test).
Figure 7B:
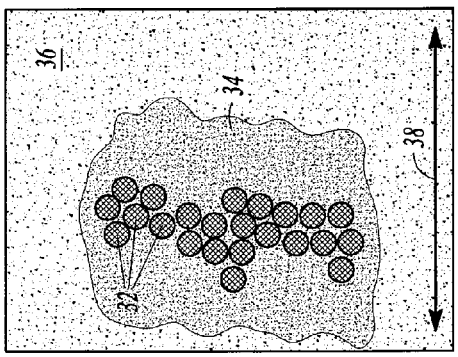
Figure 7C:
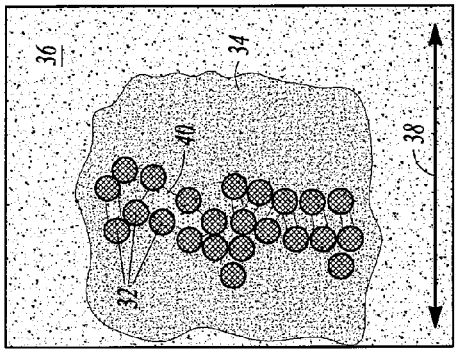
Figure 7D:
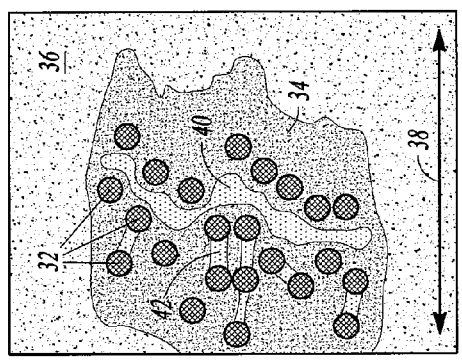
Figure 7E:
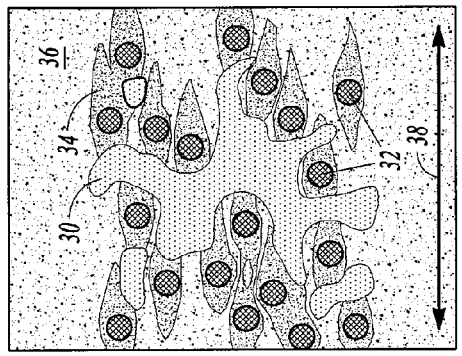

The presence of miscible grafted chains modifies the morphology of the deformation areas, switching from crazes to shear bands (FIG. 7D). At their birth, shear bands are not well defined. Their edges are diffused and the bands are not straight. The thickness does not drop suddenly at the edge, but slowly decreases from the edge to the center (e.g., shoulders). The thickness varies considerably inside of the band, as shown by the TEM contrast. The film is thinner in the areas that do not include any particles. As in the case of non-miscible grafted chains, the nanoparticles included in the bands are separated from each other, such that the structures can be destroyed. In the case of shear bands, no depletion tails are visible around the particles. The nanoparticles can be unevenly dispersed in the shear bands, such that areas can be nanoparticle free. In those areas, the film can form structures resembling a net. This irregularity inside of the plastic bands can be due to a large amount of long chains having a limited mobility. Because those chains cannot freely move, the thickness cannot evolve regularly. The force can be unevenly distributed along the band and irregularities can appear. Some "sub deformation bands" can be formed between the particles.

Polarized Infrared experiments can be used to quantify the alignment of the chains inside of the film. Samples can be prepared in the same way as used for the bulge test, but the polystyrene (PS) of the matrix can be substituted with deuterated polystyrene (dPS), such as to discriminate the orientation of the grafted and free chains. The orientation can be verified before any deformation, because an initial orientation can modify the mechanical properties. To perform the measurements, scans can be performed with vertically and horizontally polarized beams perpendicular to the sample (e.g., represented by lines 2 and 4 in FIG. 5A). FIG. 5A also shows the horizontal polarized spectrogram acquired with a tilt of 30° along the horizontal axis (shown as line 6 in FIG. 5A). This can be used to detect the presence of anisotropy in the sample plan. In an example, no samples exhibited this kind of alignment, and the structures can be anisotropically oriented in the samples. If the spin coating can eventually order the chains, annealing seems to erase it.

The samples are then tilted of 30 degrees along the vertical axis and scans are one more time acquired with vertically and horizontally polarized beams. The spectrogram obtained for the vertical polarization should superpose to the one obtained without tilting if the thickness of the sample didn't change (no significant variation was observed), but the spectrogram obtained for the horizontal polarization will be sensitive to the tilt and the orientation along the X axis (perpendicular to the film). The absorbance along the X axis can be calculated with the Schmidt equation presented below:

$$A_x = \frac{A_\alpha \left(1 - \frac{\sin^2\alpha}{n^2}\right)^{1/2} - A_z}{\frac{\sin^2\alpha}{n^2}} + A_z$$

Where "$\alpha$" can represent the angle of tilt applied to the sample, "$A_\alpha$" can represent the perpendicular absorbance measured with the angle $\alpha$, "$A_z$" can represent the perpendicular absorbance measured without angle $\alpha$, "$A_x$" can represent the absorbance along the X axis (e.g., a depth of the sample), and "n" can represent the refractive index of the sample.

The ratio "$R=A_z/A_\alpha$" can represent a simple way to quantify the possible orientation of the chains perpendicularly to the film. Generally, all films, with or without particles, for grafted and free chains, R is greater than one. Therefore, even without nanoparticles, the chains are generally aligned parallel to the film plane (without any alignment inside of the plane). This natural alignment is due to the low thickness of the films in which the random coil of the polymer is compressed in a disc like shape parallel to the film.

Figure 5B:
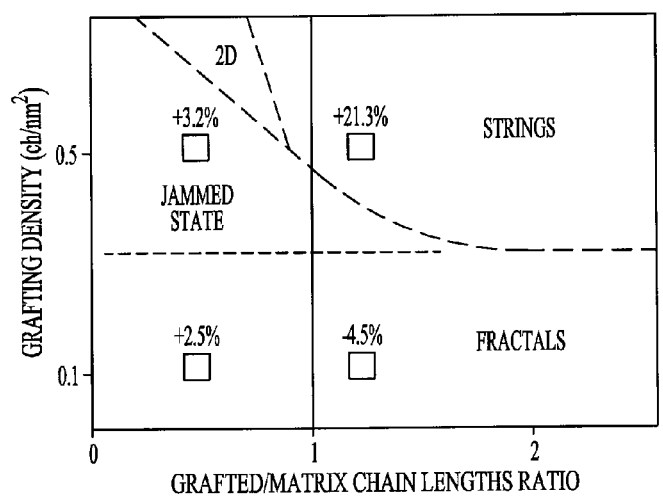
FIG. 5B shows an illustrative example of a view of the variation of the plan on depth absorbance ratio (R) depending on the grafting density and grafted/matrix chains length ratio (presented as percentage compared to the pure dPS film, the values presented are averaged of the data obtained from 2270 and 2192 nm$^{-1}$ dPS characteristic bands, 5 wt % of silica).

In the case of the presence of grafted chains, those have an R value very similar to the matrix. FIG. 5B shows the variation of the R value in presence of grafted particles (5 wt % of silica) for four different situations: short fractals, long fractals, jammed state, and strings. String structures seem to have an impact on the matrix chains orientation (more than 20%, other structures presenting positive or negative influence of less than 5%), increasing the orientation along the plan. The long grafted chains are strongly "pushed away" by the particles during their approach and have to be oriented perpendicularly to the strings. Because of the opposite position of the aggregation sites, the chains can actually stay at the surface, maintaining a two dimensions alignment. Moreover, due to their miscibility with the matrix, the chains can transfer their orientation to the free chains. In the fractal structures, the particles having more aggregation points, not all the chains can align at the surface, limiting the orientation factor. In addition, non miscible chains can have no way to transmit an alignment to the matrix.

Plastic Deformation Mechanisms

FIGS. 6A through 6F and 7A through 7F represent the differentiated mechanisms of initiation and growth of the plastic bands depending of the miscibility of the grafted chains with the matrix. Those proposed mechanisms not only explain the obtained reinforcement, but also the morphologies of those bands observed by TEM. Immiscible chains lead to crazes and miscible chains to shear bands.

FIG. 6A shows a schematic representation of a fractal structure 10 before the test or in the elastic behavior. Nanoparticles 12 can be grated with graft polymer 14 comprising polymer chains. The graft polymer chains 14 and the polymer matrix 16 can be substantially immiscible with respect to each other so that they do not have (or include few) intertwining between each other and the result can be a clean interface between the graft polymer 14 and the polymer matrix 16. This interface can be a weak point in the system, and because this structure can be oriented perpendicularly to the tensile direction (represented by the double arrow 18), a long part of it can be exposed directly to the force 18. A plastic deformation or craze 20 can begin to form at this interface (FIG. 6B) and can give birth to a crazing mechanism.

As shown in FIG. 6B, the deformation 20 appears on the right side, but it can happen on the left side the same way, or even partially across the fractal if the example has not been well aligned perpendicularly to the traction direction. Then the nucleation of the craze 20 can propagate along the sample forming a deformation band 22 (FIG. 6C), still orthogonal to the applied force. This nucleation can require less energy than a homogeneous one and the yield stress can be correspondingly decreased. Then the band 22 can begin to grow (e.g., widen), and draw the graft polymer 14 around to align the polymer chains of the graft polymer 14 along the tensile direction 18 and can include them in fibrils 24 (in this case, membrane-like fibrils 24 as shown by FIG. 6D).

The graft polymer chains 14 grafted to the nanoparticles 12 can have a limited mobility and generally cannot be realigned freely. Moreover, to expand, the band 22 can engulf the nanoparticles 12 at its edge, a process slowed down by the strong interactions between the nanoparticles 12. This can result in a lack of graft polymer 14 to form the alignment in front of the nanoparticles 12 and to the formation of holes 26 in the membranes. The holes 26 can form branching into the fibrils 24, looking like a tail to the nanoparticles 12. This can be compared to the crosslinking that forms nodes and attaching points between fibrils. This process can decompose all the structures encountered, digesting them, during the growth of the band 22. In addition, the constant presence of the graft polymer chains 14 at the formation front of the fibrils 24, graft polymer chains 14 fixed to the nanoparticles 12 in the non-extended material or inside the fibrils 24 can reinforce this front by bridging and can provide the formation of a crack responsible for the fatal failure of the sample. This effect, combined to the encouraged formation of load bearing crazes instead of cracks at the yield stress, can explain the high resistance of those films to failure.

FIG. 7A shows a schematic diagram of a structure 30 comprising nanoparticles 32 grafted with a graft polymer 34 that can be substantially miscible in the polymer matrix 36. The miscible graft polymer chains 34 can modify the process (FIGS. 7A through 7F), and such a process need not be craze-based anymore. Those graft polymer chains 34, such as having a limited mobility due to their attachment to the particles, can be spread all over the sample, even if the scheme only represents only one structure. Upon application of a force tensile direction (represented by the double arrow 38), this immobility can block the formation of the generally-recognized craze, such as the craze 20 shown in FIG. 6C, in which the chains can realigned by sliding along each other. Due to this, a clean craze need not be formed, and the yield stress can be postponed. In an example, only diffuse shearing bands 40 that are generally perpendicular to the tensile direction appear, in which only the chains of the polymer matrix 36 can be plastically aligned (FIGS. 7B and 7C), but the force needed to perform this alignment can be increased by the presence of the fixed chains. The bands can have no defined edges and in some cases can only be visible due to the change of thickness (contrast in TEM).

Figure 7F:
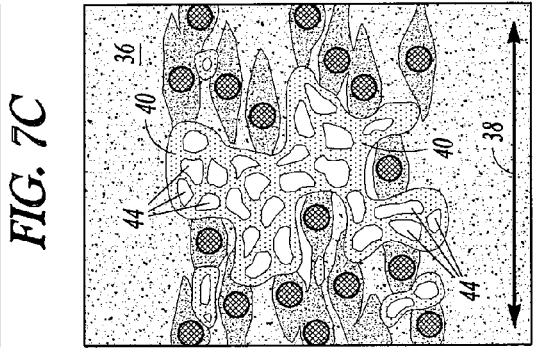

Inside of the so-called shearing bands 40, the traction can also begin to separate the nanoparticles 32 (FIG. 7C). This separation can create a gap between each set of separated nanoparticles 32, and generally not a complete hole, such as because of the layers of the polymer matrix 36 and the graft polymer chains 34 below the surface. The area between separated particles 32, e.g., area 42 shown in FIG. 7D, can also have a lower thickness than the rest of the band 40. Around the nanoparticles 32 themselves, the thickness generally does not decrease, such as in part due to the presence of the graft polymer chains 34 still fixed to the nanoparticles 32. This can create a non-homogeneity in the thickness of the band 40 (FIGS. 6D and 6E). The thinnest parts of the bands 40, in some cases almost monolayers of polymer, can reorganize, to form real holes 44 (FIG. 7F).

Contrary to crazes, such as craze 20, shear bands 40 generally do not nuclei to cracks. In one approach, it was believed that such a deformation system should present a better endurance than generally-recognized forms of crazes in pure PS films, but should also present a better endurance than reinforced crazes observed in the case non miscible fractals, such as those in FIGS. 6A through 6F. This was not the case. The present inventors have recognized, among other things, that even if shear bands 40 are not theoretically nuclei to crack formation, the forced separation of the nanoparticles 32 can create depletion and holes 44 inside of the bands 40, which can themselves provoke a crack creation. As fractals present initially more contacts between the particles, the amount of defects inside of the bands 40 can be higher than in the strings case, and the films can break easily, such as shown in the illustrative examples of FIGS. 3 and 4.

As demonstrated in FIGS. 6A through 6F and 7A through 7F, percolated networks can present a low failure strain compared to other structures. In those samples, the high density of silica and continuous structures of particles all along the samples can prevent the propagation of the polymer based deformation processes, such as crazes and shear bands. If plastic deformation responses such as crazes and shear bands do not form in the system, cracks can form and propagate all along the sample leading to a rapid failure. Experimentally, the sample can simply explode, leaving no traces of the free standing films. For this reason no real image can be obtained of formation of such cracks.

Elastic Modulus Improvement

If the improvement of the Yield Stress and the Failure Strain can be explained by a modification of the plastic deformation mode, the elastic modulus is generally believed to be more complex. Several factors can be taken into account: lateral chains orientation, inter-particle and particles-matrix interactions, and form factor.

Notes

The non-limiting examples discussed above or embodied in the claims below can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of forming a solid-state polymer, the method comprising:
   grafting a graft polymer to nanoparticles to provide grafted nanoparticles; and dispersing the grafted nanoparticles in a polymer matrix to provide a specified loading of the grafted nanoparticles within the polymer matrix to form a solid-state polymer, wherein the solid state polymer has an elastic modulus from about 3.5 GPa to 4.6 GPa, a yield stress from about 21 mPa to about 25.5 MPa, and a strain-to-failure from about 2% elongation to about 4.75% elongation.

2. The method of claim 1, wherein the solid-state polymer has an increased modulus, an increased yield stress, and an increased strain-to-failure compared to the polymer matrix without the grafted nanoparticles dispersed therein.

3. The method of claim 1, wherein the specified loading is below a percolation threshold concentration of the grafted nanoparticles within the polymer matrix.

4. The method of claim 1, wherein the specified loading is less than 7 weight percent grafted nanoparticles within the polymer matrix.

5. The method of claim 1, wherein the specified loading is about 5 weight percent grafted nanoparticles in the polymer matrix.

6. The method of claim 1, wherein dispersing the grafted nanoparticles comprises forming a spatially uniform dispersion of the grafted nanoparticles within the polymer matrix.

7. The method of claim 1, wherein the nanoparticles include silica nanoparticles.

8. The method of claim 1, wherein the graft polymer is immiscible within the polymer matrix.

9. The method of claim 1, wherein the graft polymer is miscible within the polymer matrix.

10. The method of claim 1, wherein the graft polymer includes polystyrene.

11. The method of claim 1, wherein the polymer matrix includes a homo-polystyrene matrix.

12. A solid-state polymer comprising:
    grafted nanoparticles comprising a graft polymer grafted to nanoparticles; and
    a polymer matrix, in which the grafted nanoparticles are dispersed to form a solid-state polymer, the dispersion configured to provide a specified loading of the grafted nanoparticles within the solid-state polymer,
    wherein the solid state polymer has an elastic modulus from about 3.5 GPa to 4.6 GPa, a yield stress from about 21 mPa to about 25.5 MPa, and a strain-to-failure from about 2% elongation to about 4.75% elongation.

13. The solid-state polymer of claim 12, wherein the solid-state polymer has an increased modulus, an increased yield stress, and an increased strain-to-failure compared to the polymer matrix without the grafted nanoparticles dispersed therein.

14. The solid-state polymer of claim 12, wherein the specified loading is below a percolation threshold concentration of the grafted nanoparticles.

15. The solid-state polymer of claim 12, wherein the specified loading is less than 7 weight percent grafted nanoparticles in the polymer matrix.

16. The solid-state polymer of claim 12, wherein the specified loading is about 5 weight percent grafted nanoparticles in the polymer matrix.

17. The solid-state polymer of claim 12, wherein the solid state-polymer is an amorphous solid-state polymer.

18. The solid-state polymer of claim 12, wherein the specified loading is below the percolation threshold concentration of the nanoparticles.

19. The solid-state polymer of claim 12, wherein the nanoparticles include silica nanoparticles.

20. The solid-state polymer of claim 12, wherein the graft polymer includes polystyrene.

21. The solid-state polymer of claim 12, wherein the polymer matrix includes a homo-polystyrene matrix.

* * * * *